United States Patent
Tchapda (10) Patent No.: US 8,401,000 B2
(45) Date of Patent: Mar. 19, 2013

(54) METHOD OF PROCESSING DATA PACKETS

(75) Inventor: Yves Constantin Tchapda, Manchester (GB)

(73) Assignee: Virtensys Limited, Cheshire (GB)

( * ) Notice: Subject to any disclaimer, the term of this patent is extended or adjusted under 35 U.S.C. 154(b) by 509 days.

(21) Appl. No.: 12/430,480

(22) Filed: Apr. 27, 2009

(65) Prior Publication Data

US 2009/0268738 A1  Oct. 29, 2009

Related U.S. Application Data (60) Provisional application No. 61/048,314, filed on Apr. 28, 2008.

(30) Foreign Application Priority Data

Apr. 28, 2008 (GB) .................................. 0807671.3

(51) Int. Cl.
*H04J 3/24* (2006.01)
(52) U.S. Cl. .................... 370/349; 370/392; 370/395.21
(58) Field of Classification Search .................. None
See application file for complete search history.

(56) References Cited

U.S. PATENT DOCUMENTS

| | | | |
|---|---|---|---|
| 6,175,889 B1 * | 1/2001 | Olarig | 710/309 |
| 6,301,645 B1 | 10/2001 | Porterfield | |
| 6,950,428 B1 | 9/2005 | Horst et al. | |
| 7,120,722 B2 | 10/2006 | Sharma et al. | |
| 2003/0217219 A1 * | 11/2003 | Sharma et al. | 710/311 |
| 2006/0126612 A1 * | 6/2006 | Sandy et al. | 370/389 |
| 2006/0193327 A1 * | 8/2006 | Arndt et al. | 370/395.21 |
| 2006/0195617 A1 | 8/2006 | Arndt et al. | |
| 2006/0242332 A1 | 10/2006 | Johnsen et al. | |
| 2006/0242333 A1 | 10/2006 | Johnsen et al. | |
| 2007/0097950 A1 | 5/2007 | Boyd et al. | |
| 2007/0165592 A1 * | 7/2007 | Gossain et al. | 370/349 |
| 2008/0209099 A1 * | 8/2008 | Kloeppner et al. | 710/314 |

FOREIGN PATENT DOCUMENTS

| | | |
|---|---|---|
| GB | 2 431 757 A | 5/2007 |
| WO | WO 2006/039051 | 4/2006 |
| WO | WO 2006/089914 A1 | 8/2006 |

OTHER PUBLICATIONS

International Search Report and the Written Opinion for PCT/GB2009/000850, dated Aug. 19, 2009, (12 pages).
Search Report for GB0807671.3, dated Aug. 6 2008, (1 page).

* cited by examiner

*Primary Examiner* — Andrew Chriss
*Assistant Examiner* — Salvador E Rivas
(74) *Attorney, Agent, or Firm* — Barnes & Thornburg LLP (57) ABSTRACT

A method and apparatus for processing data packets. Each data packet comprises data intended to indicate a source of the data packet. The method comprises creating a data packet at a control element. The data of the second data packet intended to indicate a source of the second data packet comprises data indicating the first source, and further comprises data indicating that the second data packet was created by the control element, the second data packet is transmitted to a destination.

27 Claims, 7 Drawing Sheets

METHOD OF PROCESSING DATA PACKETS

The present application claims priority, under 35 U.S.C. §119(a), to British Patent Application No. 0807671.3, filed Apr. 28, 2008, and claims the benefit under 35 U.S.C. §119(e) of U.S. Provisional Application No. 61/048,314, filed Apr. 28, 2008, both of which are hereby expressly incorporated by reference in their entirety.

The present invention relates to a method and apparatus for processing data packets in a computer system.

It is often necessary to send data between devices in a computer system, for example it is often necessary to connect a processing device to a plurality of input and output devices. Appropriate data communication is achieved by connecting the devices in such a way as to allow them to send data packets to each other over a physical link, which may be a wired link or a wireless link. The sending and receiving of data packets is often described in terms of transactions. A transaction involves one or more data packets being sent between devices.

It is known in the art to use a switch to route data packets from an output of one device to inputs of one or more other devices. Such a switch comprises one or more input ports arranged to allow the data packets to be received by the switch, and a plurality of output ports arranged to allow the data to be transmitted from the switch.

Many conventional computer systems do not share input/output (I/O) devices. That is, each computer has its own dedicated I/O devices. It is, however, advantageous to allow the sharing of I/O devices such that a plurality of computers can access one or more shared I/O devices. This allows an I/O device to appear to a computer system to be dedicated (i.e. local) to that computer system, while in reality it is shared between a plurality of computers.

Sharing of I/O devices can be implemented using what is known as I/O virtualization. I/O Virtualization allows physical resources (e.g. memory) associated with a particular I/O device to be shared by a plurality of computers. One advantage of I/O virtualization is that it allows an I/O device to appear to function as multiple devices, each of the multiple devices being associated with a particular computer.

Sharing of I/O devices can lead to better resource utilisation, scalability, ease of upgrade, and improved reliability. One application of I/O virtualization allows I/O devices on a single computer to be shared by multiple operating systems running concurrently on that computer. Another application of I/O virtualization, known as multi-root I/O virtualization, allows multiple independent computers to share a set of I/O devices. Such computers may be connected together by way of a computer network.

One particular I/O system is PCI Express. In PCI Express each I/O device may have up to eight logically independent functions. Each independent function of a device has an identifier uniquely identifying each particular function. The identifier of a device function is comprised of the PCI bus number of the bus on which the device is connected, the device number of the device and the function number of the particular function, each of which is assigned to the I/O device at system initialization by PCI configuration software.

I/O devices may require access to data in the memory of the computers to which they are connected. Access to this data is obtained through an appropriate exchange of data packets, for example a Direct Memory Access (DMA) transaction, between the requesting I/O device and the computer. Using DMA, an I/O device issues a DMA request to a particular computer, specifying a particular area of the memory to which the I/O device requires access. The computer may then send data packets containing the data stored in the requested memory location to the requesting device.

To ensure an I/O device can only access the memory regions to which it has been allocated, it is known to provide an I/O Memory Management Unit (IOMMU) which identifies a device from which a memory access request originates and controls access to memory by particular devices.

It is an object of an embodiment of the present invention to provide a method of processing data packets, and more particularly, to provide a method of processing data packets which allows I/O virtualisation to be supported.

According to a first aspect of the present invention there is provided a method of processing data packets, each data packet comprising data intended to indicate a source of the data packet, the method comprising: creating a first data packet at the control element, the data of the first data packet intended to indicate a source of the first data packet comprising data indicating a first source different from the control element, and further comprising data indicating that the first data packet was created by the control element; and transmitting the first data packet to a destination.

By including within the first data packet generated at the control element data indicating the first source, the destination of the second data packet will perceive the first data packet to have originated from the first source thereby allowing the destination to process the first data packet as if it had originated from the first source. By also including within the first data packet data indicating that the first data packet was generated at the control element, subsequent processing of data packets associated with the first data packet (e.g. data packets generated in response to the first data packet) may be based upon the fact that the control element created the first data packet. For example in a computer system implementing I/O virtualization, this allows the control element to send data packets to a destination on behalf of an I/O device, while ensuring that any response data packets will be associated with the control element.

Data packets may comprise tag values, and the data indicating that the first data packet was created at the control element may comprise a tag value in a specified range. The tag values can take any suitable form and can be, for example, sequence numbers. The tag values are intended to allow data packets to be distinguished from one another. Where the data packets are PCI Express data packets the tag values may be stored in tag fields provided by packet headers defined by the PCI Express protocol.

The specified range may be defined with reference to data stored at the control element and may be defined with reference to the first source. The first source may generate data packets having tag values in a first range, and the specified range may comprise values outside the first range. Again, taking the PCI Express protocol as an example, the first source may only use a default tag portion of a tag field. The specified range may be defined to include only tag values having a non-zero value in an extended tag portion.

The method may further comprise directing a second data packet to the control element by a switching device, the second data packet being generated in response to the first data packet. That is, the second data packet may be a completion packet such that the first data packet and the second data packet together define a transaction. The second data packet may have an tag value. First and second data packets which together define a transaction may have related tag values, for example the same tag value.

The second data packet may be provided to the control element at a switching device if but only if the second data packet comprises data indicating that the second data packet was generated in response to a data packet generated by the control element. If it is determined, at the switching device, that the second data packets was not generated in response to a data packet generated by the control element, the second data packet may be directed to a destination specified within the second data packet. The data indicating that the second data packet was generated in response to a data packet generated by the control element may comprise a tag value in the specified range. Data indicating the specified range may be stored at the switching device.

The first source may be an input or output device. The destination may be a computing device. A plurality of computing devices may be provided with shared access to one or more input or output devices.

The method may comprise receiving at the control element a third data packet associated with the first source. The third data packet may be generated by the first source and forwarded to the control element by a switching device. The control element may create the first data packet in response to receiving the third data packet. The control element may generate a fourth data packet in response to receiving the third data packet. The fourth data packet may be transmitted to the first source.

The third data packet may be processed at the switching device to determine whether the third data packet satisfies a predetermined criterion. The third data packet may be forwarded to the control element if but only if the third data packet satisfies the predetermined criterion. The predetermined criterion may be based upon a type of transaction with which the third data packet is associated.

The third data packet may be a PCI Express data packet. In such a case the predetermined criterion referred to above may be that the third data packet is associated with a control transaction. That is, while data packets associated with control transactions are forwarded to the control element, data packets associated with data transactions may be routed by the switching device in a conventional manner.

According to a second aspect of the present invention, there is provided an apparatus for processing data packets, the apparatus comprising: a memory storing processor readable instructions and a processor configured to read and execute instructions stored in the memory. The instructions comprise instructions controlling the processor to carry out a method as described above.

According to a third aspect of the present invention, there is provided a control element for processing data packets, each data packet comprising data intended to indicate a source of the data packet, the control element comprising: a processor arranged to create a first data packet, the data of the first data packet intended to indicate a source of the first data packet comprising data indicating a first source different from the control element, and further comprising data indicating that the first data packet was created by the control element; and a transmitter arranged to transmit the first data packet to a destination.

According to a fourth aspect of the present invention there is provided a method of processing a received data packet having an associated request data packet, the method comprising: determining a tag value indicative of a request data packet associated with a received data packet; processing the tag value to determine whether the request data packet was generated by a control element; and forwarding the received data packet to the control element if but only if it is determined that the request data packet was generated by the control element. Otherwise, the received data packet may be forwarded to a destination specified in the received data packet.

Thus, where a control element generates data packets on behalf of one or more source devices (for example I/O devices), the fourth aspect of the invention allows received data packets generated in response to data packets generated by the control element to be identified and forwarded to the control element.

Determining whether the request data packet was generated by the control element may comprise determining whether the tag value is within a specified range. The specified range may be defined with reference to data stored at the control element and/or a switching device. The specified range may be defined with reference to at least one source of data packets, said at least one source of data packets being in communication with the control element. The at least one source of data packets may generate tag values in a first range, and the specified range may comprise tag values outside the first range.

It will be appreciated that many features described in connection with one aspect of the invention are applicable in connection with other aspects of the invention.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Preferred embodiments of the present invention will now be described, by way of example, with reference to the accompanying drawings in which.

Figure 1:
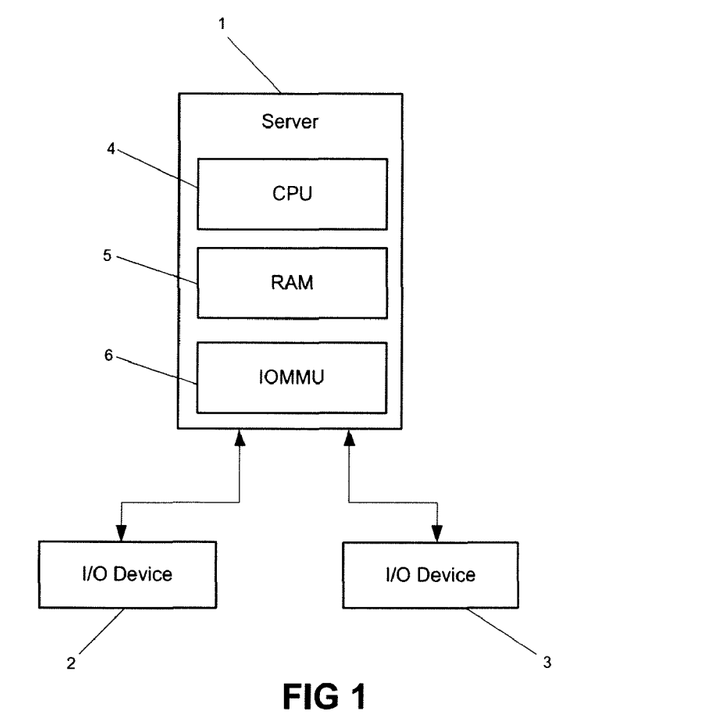
FIG. 1 is a schematic illustration showing a server connected to a plurality of I/O devices.

Referring first to FIG. 1, a server 1 is connected to two input/output (I/O) devices 2, 3 such that data can be sent between the server 1 and the I/O devices 2, 3. The I/O devices 2, 3 can take any suitable form, and can be, for example, network interface cards, storage devices, or graphics rendering devices.

The server 1 comprises a CPU 4 and volatile memory in the form of RAM 5. To allow for effective and efficient data transfer between the server 1 and the I/O devices 2, 3 the I/O devices 2, 3 are able to directly write data to and read data from the RAM 5, an arrangement referred to as Direct Memory Access (DMA).

Access to the RAM 5 by the I/O devices 2, 3 is handled by an I/O memory management unit (IOMMU) 6 so as to restrict the areas of the RAM 5 to which particular I/O devices have access and also to restrict the operations which particular I/O devices can carry out. The IOMMU 6 therefore determines an identifier of an I/O device attempting to access the RAM 5 to determine whether the I/O device should be allowed to access the requested part of the RAM 5. In this way the IOMMU 6 allows reliability and security to be improved, ensuring that areas of memory associated with particular I/O devices cannot be accessed and corrupted by other, possibly malfunctioning, I/O devices.

In addition to improving reliability and security, the IOMMU 6 provides a virtualized view of the physical address space of the RAM 5. That is, the I/O devices 2, 3 need not have any knowledge of the way in which the physical address space of the RAM 5 is arranged. Instead, the I/O devices 2, 3 are provided with a respective virtualized view of a part of the RAM 5 to which they have access. When the I/O device 2, for example, wishes to access a memory location in the RAM 5, the shared I/O device 2 generates a memory access request, specifying a virtual address in the RAM 5. The IOMMU 6 translates the virtual address specified in the memory access request into a physical address directly corresponding to a physical memory location in the memory RAM 5.

Figure 2:
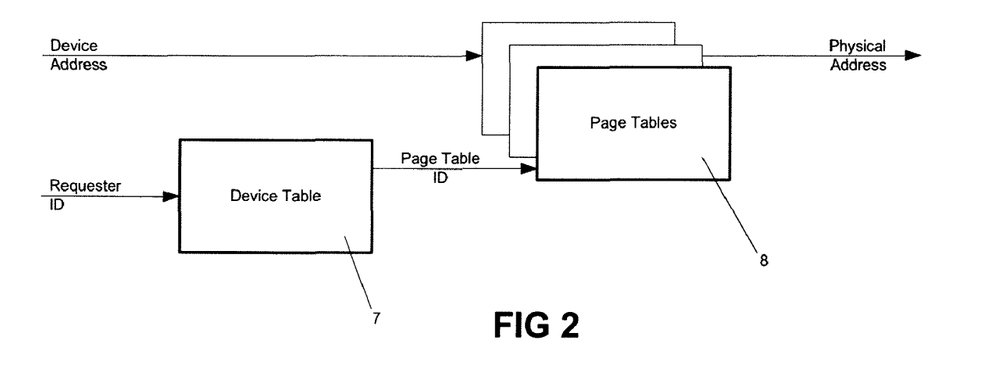
FIG. 2 is a schematic illustration showing the I/O memory management unit (IOMMU) of FIG. 1 in further detail.

FIG. 2 schematically shows operation of the IOMMU 6 in further detail. It can be seen that the IOMMU comprises a device table 7 and page tables 8. The identifier of a requesting I/O device is provided to the device table 7. This identifies an appropriate one of the page tables 8 to which the device address should be provided as an input so as to generate a physical address which can be used to access the RAM 5. In this way, it can be seen that an I/O device is only able to access the relevant page table, and consequently is only able to access the parts of the RAM 5 to which it has authorized access. Entries of both the device table 7 and the page tables 8 may further comprise permission bits indicating whether a particular device is permitted read/write access, read only access or no access at all to a particular memory location. The IOMMU 6 performs error checking and generates a page fault if an invalid address is provided by a particular device or the permission bits indicate that the requested access is not permitted. Such a page fault may result in an error being generated and reported to the relevant device.

Figure 3:
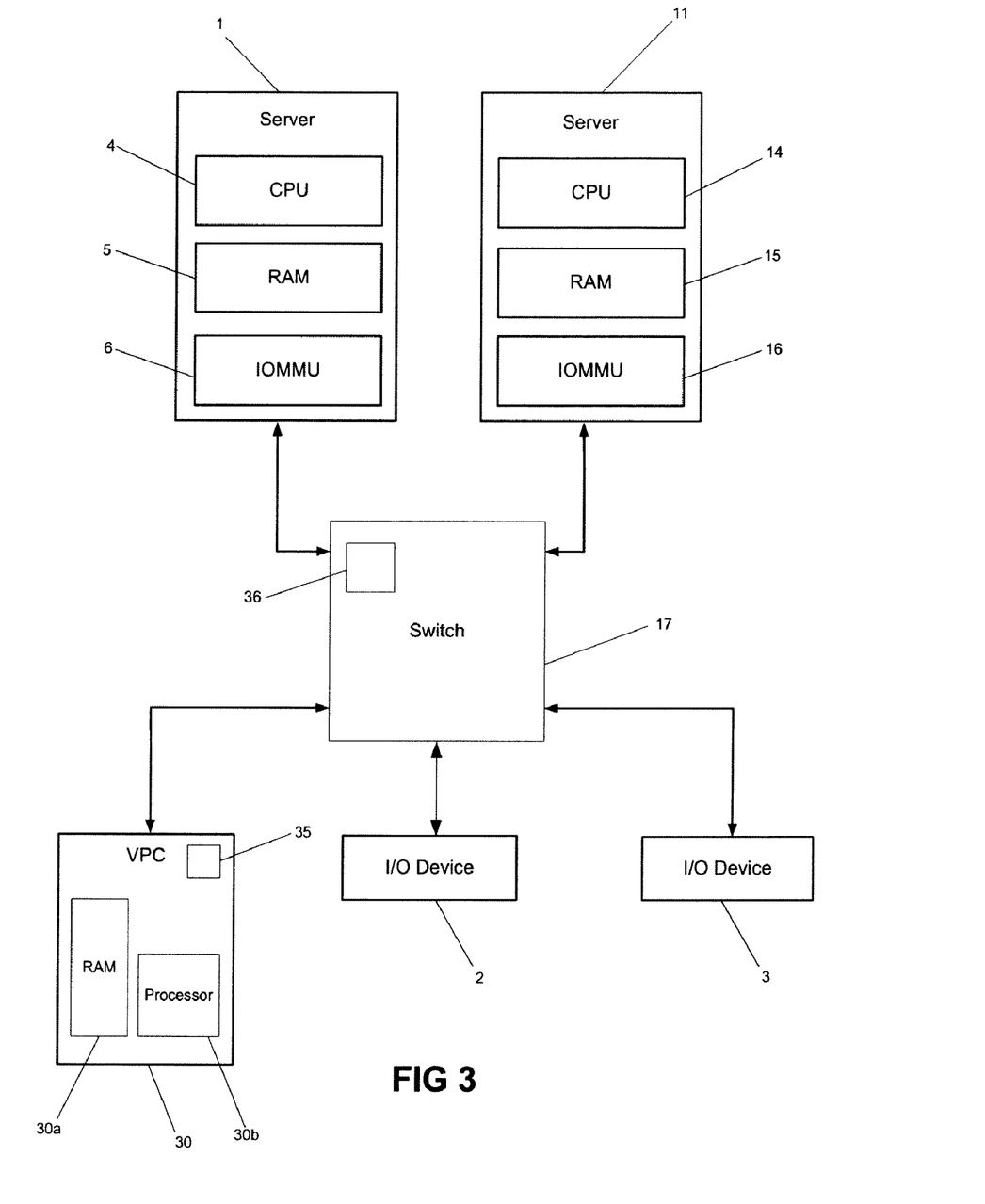
FIG. 3 is a schematic illustration of a plurality of servers connected to a plurality of I/O devices and a virtualization proxy controller (VPC) via a switch adapted according to an object of the present invention.

FIG. 3 shows an embodiment of the invention in which two servers 1, 11 are both provided with access to the I/O devices 2, 3. It can be seen that the server 11 is of a similar form to the server 1 described above, comprising a CPU 14, RAM 15 and an IOMMU 16. The two servers 1, 11 access the I/O devices 2, 3 through a switch 17 to which the servers 1, 11 and the I/O devices 2, 3 are connected. The I/O devices 2, 3 and the servers 1, 11 communicate using the PCI Express protocol. That is, the I/O devices 2, 3 are PCI Express devices and the switch 17 is a PCI Express switch. The servers 1, 11 are provided with functionality to allow communication using the PCI Express protocol. It will be appreciated that PCI Express is used merely by way of example and that other network interconnect technologies could be similarly employed, suitable examples of such technologies are discussed further below.

The servers 1, 11 communicate with the I/O devices 2, 3 by sending and receiving data packets through the switch 17. Each of the servers 1, 11 may transmit data packets to or receive data packets from some or all of the shared I/O devices 2, 3. A transaction between one of the I/O devices 2, 3 and one of the servers 1, 11 may be made up of one data packet or a plurality of data packets. For example, a single transaction may involve a device sending a request data packet to one of the servers and the server responding by sending one or more completion data packets to the device.

Each of the I/O devices 2, 3 may have a plurality of independent device functions, a maximum of eight functions being supported by the PCI Express protocol. That is, for example, the shared I/O device 2 may appear to the servers 1, 11 to be eight separate devices. Each device function of each shared I/O device 2, 3 has a corresponding identifier uniquely identifying that function. Data packets sent from a particular device function of a shared I/O device 2, 3 have a transaction identifier comprising a requester identifier that corresponds to the identifier of the device function sending the data packet.

The format of a data packet header used by the PCI Express protocol is now described with reference to FIG. 4. A requester identifier 20 identifies a device function which originated the data packet and comprises sixteen bits indexed from 0 to 15. It can be seen that the requester identifier 20 comprises a bus number field 21 occupying an upper eight bits, device number field 22 occupying a central five bits and function number field 23 occupying a lower three bits. When using the PCI Express protocol the combination of bus number 21, device number 22 and function number 23 uniquely identifies a function provided by a particular device.

Figure 4:
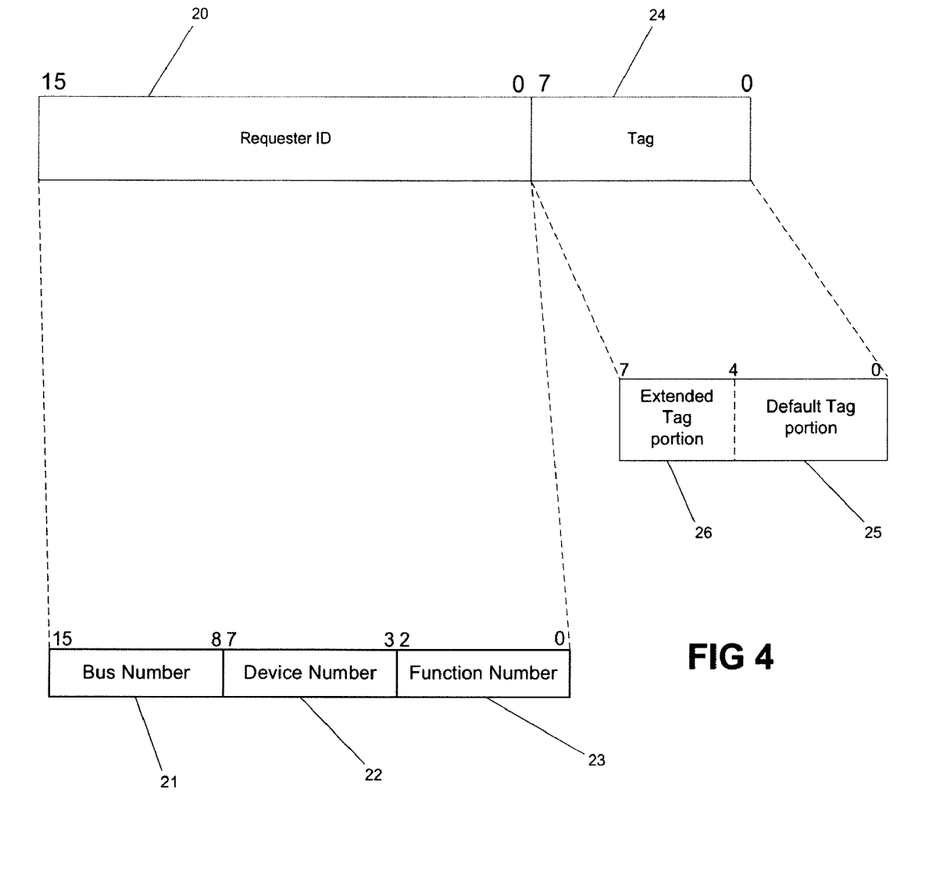
FIGS. 4 and 5 are schematic illustrations of a data packet header.

The packet header shown in FIG. 4 further comprises a tag field 24 comprising eight bits. As described above, a transaction may be made up of a request data packet and one or more corresponding completion data packets. Each request data packet is associated with a value which is stored in the tag field 24. Each corresponding completion data packet has the same value stored in the tag field 24, thus associating a completion data packet with the relevant request data packet. Unique tag values are allocated to all outstanding requests that require one or more completion data packets from a destination device. Given that the tag field 24 has eight bits, two hundred and fifty-six ($2^8$) possible tag values can be represented. In practice thirty-two tag values are usually sufficient. As such, the tag field is often considered in two parts: a default tag portion 25 comprising five bits and an extended tag portion 26 comprising three bits. The default tag portion 25 can represent thirty-two possible tag values, and where this provides a sufficient number of tag values the extended tag portion 26 can simply store three bits having a zero value (i.e. 000). The extended tag portion 26 may be enabled so as to allow all eight bits of the tag field 24 to be used thereby increasing the potential number of outstanding requests to two hundred and fifty-six.

Figure 5:
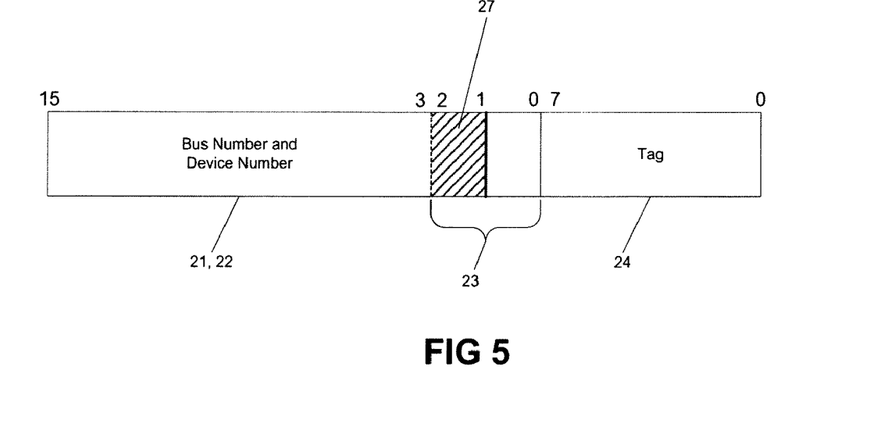

The function number field 23 is provided with a function number of the relevant function of the device sending a request. If a device has fewer than eight functions, there may be unused bits in the function number field 23. It is therefore known to use only sufficient bits of the function number field 23 to represent the functions of a device and to use any unused bits of the function number field 23 as a phantom function number which is logically combined with the tag field 24. Where only a single function is provided all bits of the function number field 23 can be logically combined with the tag field 24 to provide support for up to two thousand and forty-eight ($2^{11}$) outstanding requests. An arrangement is schematically shown in FIG. 5 in which a phantom function number 27 provides two additional bits which can be logically combined with the tag field 24 in the manner described above.

Each of the I/O devices 2, 3 has a device capabilities register (not shown) detailing the capabilities of that device. A server 1, 11 can determine if a particular I/O device supports the use of extended tags and phantom function numbers by examining the particular I/O device's device capabilities register.

Figure 6:
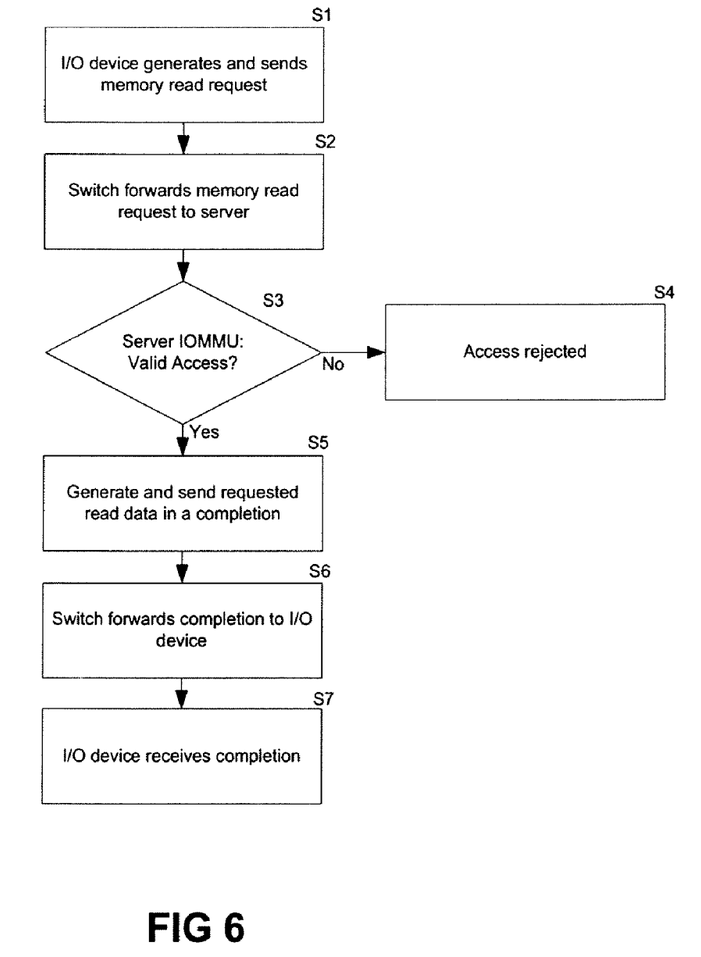
FIG. 6 is a flow chart showing the process of an I/O device sending a memory read request to a server via the switch.

As has been described above, some types of transactions comprise a request data packet and one or more associated completion data packets. Memory read requests are an example of such transactions. FIG. 6 illustrates the process of the I/O device 2 sending a memory read request to the server 1 through the switch 17 in the arrangement shown in FIG. 3.

At step S1 the I/O device 2 generates a memory read request specifying a virtual address that indirectly corresponds to a physical address in the RAM 5 of the server 1. The I/O device 2 sends the memory read request to the server 1, and the request is routed via the switch 17. At step S2 the switch 17 forwards the memory read request to the server 1, and processing passes to step S3. At step S3 the IOMMU 6 of the server 1 determines the source of the memory read request using the requester identifier of the memory read request. After determining the source of the memory read request, the IOMMU 6 determines if the source, in this case the I/O device 2, is permitted access to the requested memory location. If the source is not permitted access to the memory location, or if the request is invalid for another reason, processing passes to step S4 and the access to the requested memory location is rejected. If at step S3 it is determined that the source is permitted access to the memory location, the IOMMU 6 translates the device address specified in the memory read request into the corresponding physical address and processing passes to step S5. At step S5 the server 1 generates a completion data packet containing the data read from the requested location of the RAM 5. The server 1 sends the completion data packet to the source of the request data packet, in this case the I/O device 2. The completion data packet is sent to the switch 17 and is forwarded from the switch 17 to the I/O device 2 at step S6. At step S7 the I/O device 7 receives the completion data packet and the memory read request transaction is complete.

It will be appreciated that a similar process is used for memory read requests made from the I/O device 3 and for memory read requests made to the server 11. For example, a similar process is used if the I/O device 3 sends a memory read request to the server 1 or the server 11. Further, it will be appreciated that while the example of FIG. 3 relates to memory read requests, the process is the same for other transactions that are split into two phases (i.e. transactions involving a request data packet and one or more completion data packets). The processing of FIG. 6 is carried out by way of direct communication between the I/O device 2 and the server 1 via the switch 17. As is now described, in some circumstances processing involves an intermediary in the form of a virtualization proxy controller.

Referring again to FIG. 3 a virtualization proxy controller 30 is connected to the switch 17. The virtualization proxy controller 30 appears to the servers 1, 11 as a device. As such, the virtualization proxy controller 30 has an identifier value, and data packets sent from the virtualization proxy controller 30 would normally have the corresponding requester identifier. That said, as described in further detail below, embodiments of the invention provide methods whereby data packets sent from the virtualization proxy controller 30 do not have the corresponding requester identifier.

As described in further detail below, requests made by the I/O devices 2, 3 can be redirected to the virtualization proxy controller 30 by the switch 17. The virtualization proxy controller 30 can respond to such requests by providing appropriate reply packets to the relevant I/O device.

The virtualization proxy controller 30 is provided with memory in the form of RAM 30*a*, and a processor 30*b* arranged to control its operation. In some embodiments the RAM 30*a* and the processor 30*b* are integrated into the virtualization proxy controller 30, while in alternative embodiments the RAM 30*a* and/or the processor 30*b* are components external to the virtualization proxy controller 30. The virtualization proxy controller 30 itself generates requests which are transmitted to an appropriate one of the servers 1, 11. The servers 1, 11 may provide data to the virtualization proxy controller in response to such requests. Such data is stored in the RAM 30*a* and may be used to respond to requests made by the I/O devices 2, 3 without any need to obtain data from the relevant server in direct response to request received from one of the I/O devices 2, 3. The virtualization proxy controller is therefore arranged to act as a "proxy" between the I/O devices and the servers 1, 11.

If appropriate data packets generated by the I/O devices 2, 3 are redirected to the virtualization proxy controller 30 as described below, this can allow the I/O devices 2, 3 to be shared by the servers 1, 11 in a way which is transparent to the I/O devices 2, 3. In particular, the virtualization proxy controller 30 may be arranged to translate virtual memory addresses used by an I/O device to virtual memory addresses used by the IOMMU of the appropriate server. Such an arrangement allows each device to have its own virtual address space which can be optimized for the purposes of transparently sharing I/O devices between servers.

In the light of the foregoing description, and in order to allow the I/O devices 2, 3 to be shared by the servers 1, 11, the switch 17 is arranged to intercept some data packets sent by the I/O devices 2, 3 to the servers 1, 11 and to forward such intercepted data packets to the virtualization proxy controller 30 for processing as is described below. For example, memory read requests of the type described above with reference to FIG. 6 may be redirected to the virtualization proxy controller 30 for processing as described below.

PCI Express transactions can, for present purposes, be considered as either control transactions or data transactions. Control transactions initiated by an I/O device 2, 3 are redirected to the virtualization proxy controller 30. Data transactions are routed as described with reference to FIG. 6, that is from a source directly to a destination via the switch 17. Transactions using the PCI Express protocol can generally be classified into one of five classes:

1. Commands sent from a server to an I/O device;
2. Status read commands sent by a server relating to resources of an I/O device;
3. I/O device commands reading command descriptors in server memory;
4. I/O device commands writing status descriptors in server memory; and
5. I/O device commands reading/writing data buffers in server memory Transactions classified in classes 1 to 4 of the above list are considered to be control transactions, and data packets of such transactions are redirected to the virtualization proxy controller 30 as described in further detail below. Transactions classified in class 5 are considered to be data transactions and data packets of such transactions are not redirected to the virtualization proxy controller 30. It can be noted that data transactions make up the vast majority (approximately 90%) of transactions between servers and I/O devices.

The I/O devices preferably each use a respective virtual address space which is arranged such that transactions in different ones of the classes set out above are associated with different parts of the virtual address space. Such a virtual address space is configured by the virtualization proxy controller 30. In this way the class to which a transaction with which a data packet belongs can be determined by determining an address within the data packet.

Figure 7:
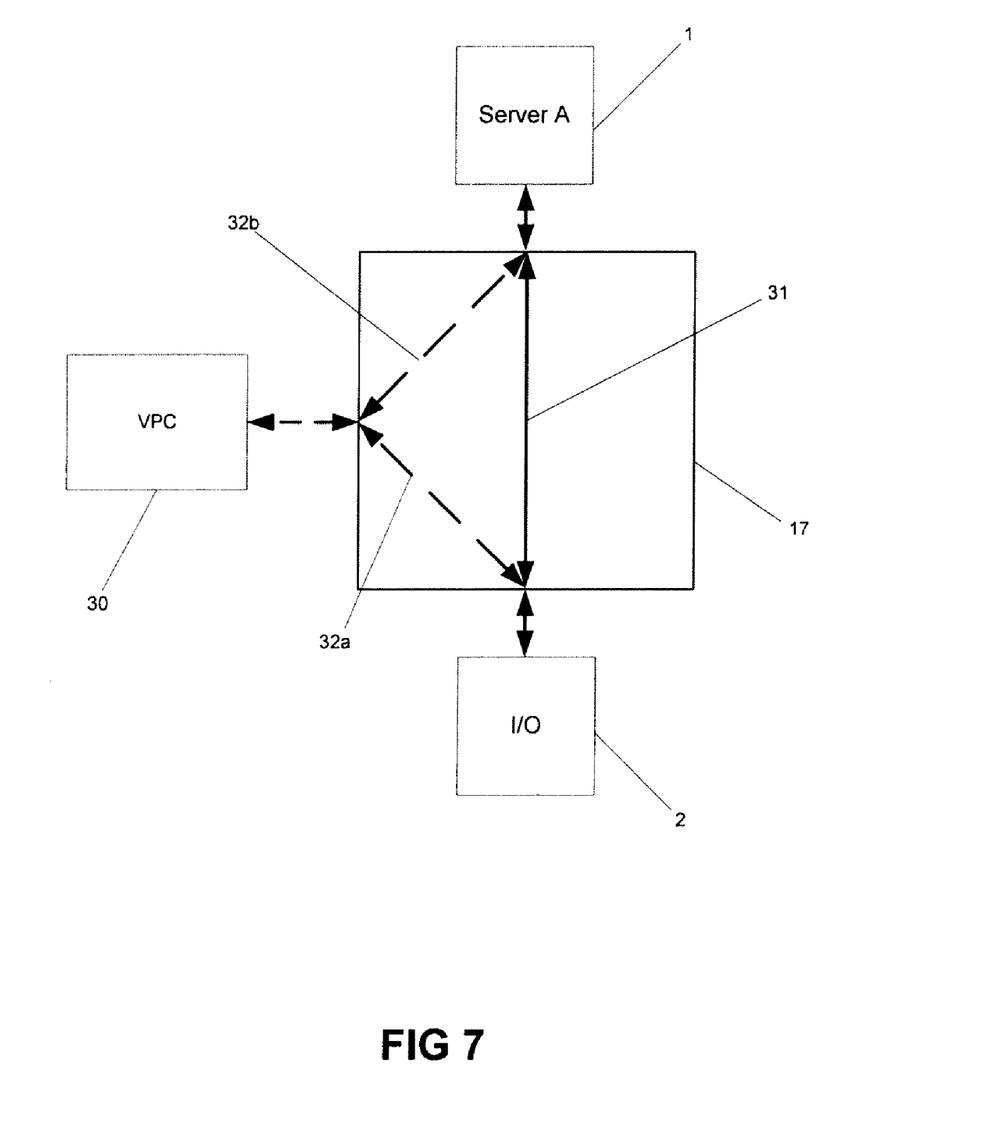
FIG. 7 is a schematic illustration of data flow between an I/O device and a server in the arrangement of FIG. 3.

The redirection of data packets of control transactions is schematically illustrated in FIG. 7, by way of an example involving a data packet sent from the I/O device 2 to the server 1. It can be seen that data packets transmitted by the I/O device 2 are received by the switch 17. Data packets which are part of data (i.e. not control) transactions are forwarded directly to the server 1 as indicated by a path 31 through the switch 17 shown in full line. Data packets which are part of a control transaction are redirected by the switch 17 to the virtualization proxy controller 30, being forwarded along a path 32a shown in broken line. Data packets are also transmitted from the virtualization proxy controller 30 to the server 1 along the path 32b. The virtualization proxy controller 30 may transmit data packets to the server 1 along the path 32b of its own volition or in response to receipt of a particular data packet from an I/O device. As is described in further detail below, the virtualization proxy controller 30 may receive data packets from the server 1, and data provided in such data packets may be stored in the RAM 30a of the virtualization proxy controller 30 for future use by the virtualization proxy controller 30 and I/O devices which transmit data packets which are received by virtualization proxy controller 30.

Figure 8:
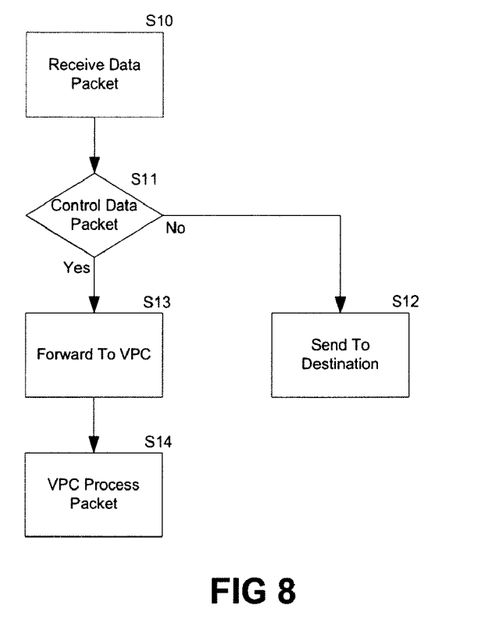
FIG. 8 is a flow chart showing in overview processing carried out in forwarding a data packet from an I/O device to the virtualization proxy controller of FIG. 3.

Forwarding of data packets to and operation of the virtualization proxy controller 30 is now described in overview with reference to FIG. 8. At step S10 a data packet is received at the switch 17 from one of the I/O devices 2, 3. At step S11 the switch 17 determines whether the received data packet is part of a control transaction; that is a transaction falling into one of classes 1 to 4 of the list set out above. If the received data packet is not part of a control transaction, the data packet is simply forwarded to its intended destination at step S12. If the received data packet is part of a control transaction the switch forwards the data packet to the virtualization proxy controller 30 at step S13. The virtualization proxy controller 30 processes the received data packet at step S14 and generates a response to the I/O device from which the data packet was received. Generating a response to the relevant I/O device may comprise transmitting a further data packet to the relevant server, or may alternatively comprise generating a data packet at the virtualization proxy controller using, for example, data stored in the RAM 30a of the virtualization proxy controller 30.

Given the manner of operation of the IOMMU as described above, it can be seen that in order to access memory associated with a particular I/O device the requester identifier of the data packet generated by the virtualization proxy controller 30 indicates that the data packet was sent by a relevant I/O device, not by the virtualization proxy controller 30. That is, the requester identifier of the data packet identifies the relevant I/O device not the virtualization proxy controller 30. Thus, data packets generated by the virtualization proxy controller 30 comprise data indicating the source of the packets to be a relevant I/O device, not the virtualization proxy controller 30, so as to allow data packets generated by the virtualization proxy controller 30 to be properly processed by the relevant server.

Referring back to FIG. 7, it can be noted that a completion data packet from the server 2 in response to a request data packet generated by the virtualization proxy controller 30 is intercepted by the switch 17 and forwarded to the virtualization proxy controller 30 along the path indicated by the broken line 32b. The completion data packet generated by the server 2 will, however, have the I/O device 2 indicated as a destination, given that completion data packets have a destination determined by the requester identifier of the corresponding request data packet. Therefore, in order to ensure that completion data packets are indeed forwarded to the virtualization proxy controller 30, appropriate completion data packets are intercepted by the switch 17 and are forwarded to the virtualization proxy controller 30.

A mechanism for allowing completion data packets to be forwarded to the virtualization proxy controller 30 is now described.

It has been described above that the tag field 24 is used to associate a particular completion data packet with its corresponding request data packet. It has also been described that many I/O devices do not use the full eight bits of the tag field 24 to represent tag values. For example, it has been described that in many cases only the default tag portion 25 is used to represent tag values. In such a case the virtualization proxy controller 30 can use tag values outside a range normally used by an I/O device, for request data packets which are created at the virtualization proxy controller 30. In this way, the switch 17 can be programmed to identify tag values outside the range normally used by the I/O device, and to forward completion data packets associated with such tag values to the virtualization proxy controller 30.

Figure 9:
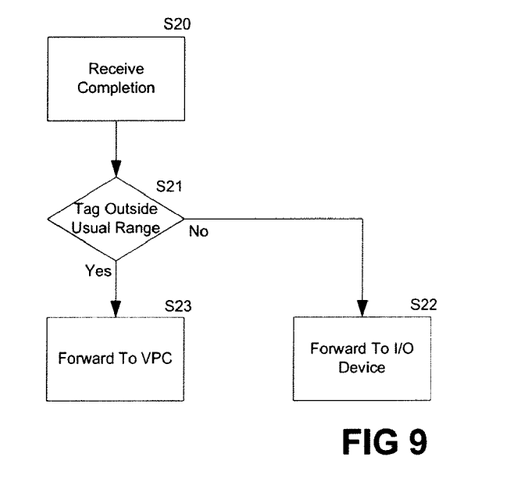
FIG. 9 is a flow chart showing in overview processing carried out in forwarding a completion data packet from a server to the virtualization proxy controller of FIG. 3.

In order to allow such use of tag values, the virtualization proxy controller 30 and the switch 17 are provided with respective spoof tag control registers 35, 36. The spoof tag control registers 35, 36 each store data indicating tag values which are not ordinarily used by a particular I/O device, such that completion data packets having such tag values should be forwarded to the virtualization proxy controller 30, rather than directly to the specified I/O device. FIG. 9 shows such processing in overview. A completion data packet is received at the switch 17 at step S20. At step S21 the spoof tag control register 36 of the switch 17 is queried to determine tag values which are used to indicate that a completion data packet should be forwarded to the virtualization proxy controller 30 rather than forwarded directly to the appropriate I/O device. If it is determined that the tag value of the received completion data packet is within the range normally used by the relevant I/O device, processing passes from step S21 to step S22 where the received completion data packet is forwarded to the relevant I/O device. Otherwise, processing passes from step S21 to step S23 where the received completion data packet is forwarded to the virtualization proxy controller 30.

Figure 10:
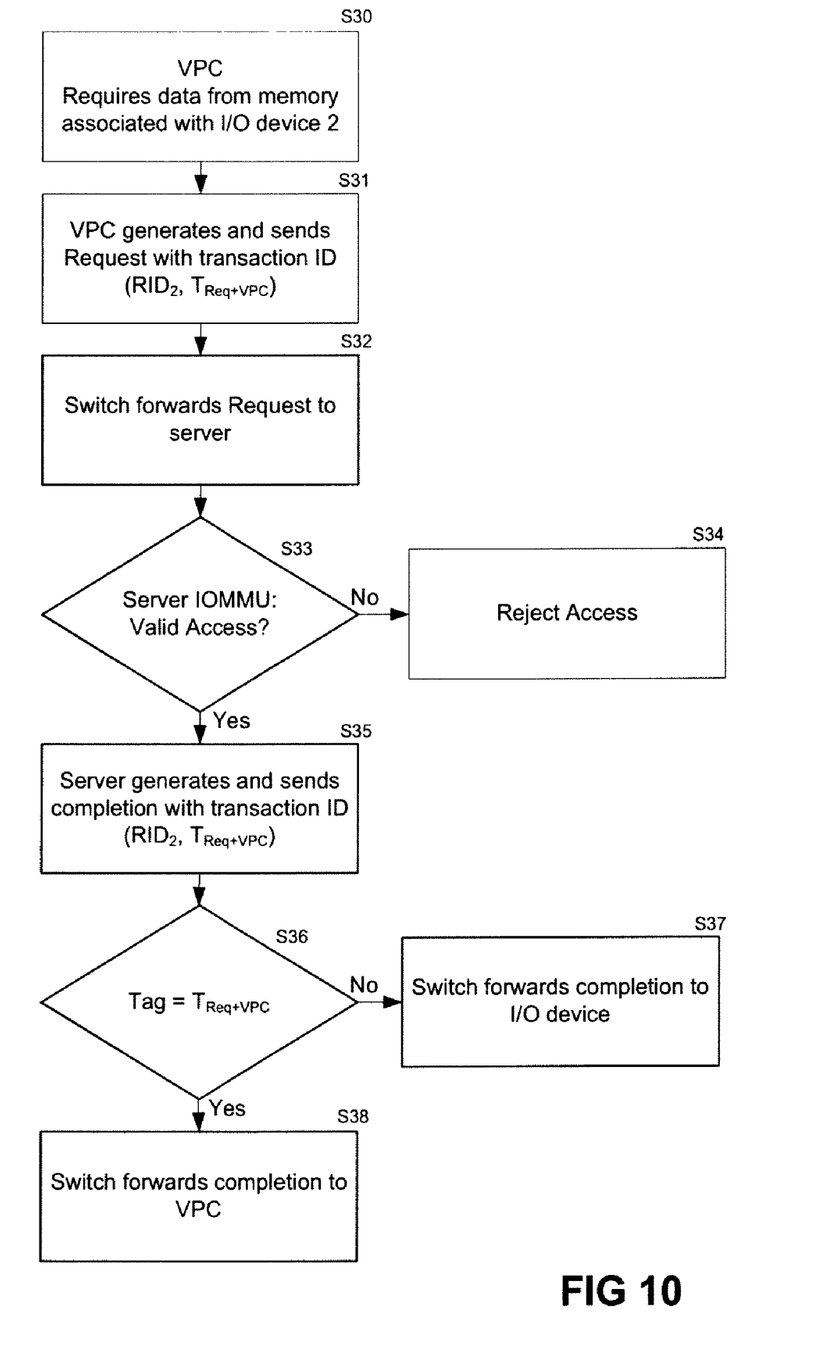
FIG. 10 is a flow chart showing in further detail the processing of data packets in the arrangement of FIG. 3.

The processing of control transactions according to an embodiment of the present invention is described in more detail with reference to FIG. 10. FIG. 10 is described below using an example of the virtualization proxy controller 30 needing to obtain data from an area of memory of the server 1 associated with a particular function of the I/O device 2. For the purposes of the following example, the particular function of shared I/O device 2 has a requester identifier $RID_2$.

At step S30 the virtualization proxy controller 30 determines that it needs to communicate with an area of memory associated with the I/O device 2. Processing then passes to step S31. At step S31, the virtualization proxy controller 30 generates an appropriate data packet. The generated data packet has a transaction identifier ($RID_2$, $T_{Req+VPC}$). That is, the new data packet has a requester identifier $RID_2$, corresponding to the requester identifier of the I/O device 2 and a tag value of $T_{Req+VPC}$, the tag value being selected to indicate that the generated data packet was generated by the virtualization proxy controller 30. The virtualization proxy controller 30 sends the generated data packet to the server 1 via the switch 17 at step S32 and processing passes to step S33.

At step S33 the IOMMU 6 of the server 1 determines the requester identifier value of the received data packet. After determining the requester identifier value of the received data packet, the IOMMU 6 determines whether access to the requested memory location is permitted. If the requested access is not permitted, or if the request is invalid for another reason, processing passes to step S34 and the access is rejected. In this example, the requester identifier of the data packet corresponds to the requester identifier of the I/O device 2. The input/output memory management unit 6 therefore allows the memory read request, despite it actually originating from the virtualization proxy controller 30 and processing passes from step S33 to step S35.

At step S35 the server 1 generates a completion data packet in response to the received request data packet, the completion data packet having a transaction identifier ($RID_2$, $T_{Req+VPC}$). The server 1 sends the completion data packet addressed to the I/O device 2 via the switch 17 and processing passes to step S36. At step S36 the switch 17 compares the tag value of the received completion data packet with the values stored in its spoof tag control register 36. If the tag field of the completion is not within the range of valid tags generated by the virtualization proxy controller 30 processing passes to step S37, where the completion data packet is forwarded to the I/O device specified in the completion data packet, in this case, the I/O device 2. If at step S36, it is determined that the tag value of the received completion data packet is within the range of tag values generated by the virtualization proxy controller 30 (as is the case here) processing passes to step S38. At step S38 the completion data packet is forwarded to the virtualization proxy controller 30.

It will be appreciated that the processing of FIG. 10 relies upon the spoof tag control register 35 of the virtualization proxy controller 30 to allow the virtualization proxy controller 30 to generate data packets having tag values outside a range normally used by an I/O device so that completion data packets associated with such data packets can be identified and forwarded to the virtualization proxy controller 30, by the use of the spoof tag control register 36 of the switch 17. Values of the spoof tag control registers 35, 36 are set by running appropriate software on a microcontroller within or associated with the switch 17 to query the connected I/O devices to determine the range of tag values which the devices use, and setting the spoof tag control registers 35, 36 to indicate tag values outside this range. For example, if all connected I/O devices only use the default tag portion 25 of the tag field 24, a single spoof tag control register in each of the switch 17 and the virtualization proxy controller 30 could be used, each register storing a value of '32' so as to indicate that tag values of greater than '32' should be used in data packets generated by the virtualization proxy controller 30. Completion data packets having tag values greater than 32 are then forwarded to the virtualization proxy controller by the switch 17. Alternatively, where different I/O devices use different tag arrangements, each of the virtualization proxy controller 30 and the switch 17 may store a plurality of spoof tag control registers, one register for each I/O device. In such a case individual registers can store values in the manner described above. Use of Extended Tags and/or Phantom Function numbers by an I/O device can be determined by examining the Device Capabilities register of a device's PCI configuration registers as described above.

It will be appreciated that other spoof tag register control arrangements may be used. For example, it will be appreciated that tag range control could be provided by a table stored in RAM allowing further configurability.

While it is the case that embodiments of the present invention have been described with reference to PCI Express, the present invention could equally be applied to other communications technologies such as Infinband, RapidIO or Hypertransport.

Further, it will be appreciated that while the above described embodiments have particular relevance to shared I/O applications, the method is generally applicable to any application which requires a device to make transactions on behalf of another device, the transactions being between the first device and a third device, and wherein the third device performs access control.

The preceding description has described embodiments of the invention where data packets are transmitted to a plurality of different servers. It will be appreciated that the term server is intended broadly and is intended to cover any computing device. While the described embodiments are based upon two servers communicating with two I/O devices, it will be appreciated that in many embodiments a larger number of servers and/or I/O devices will be used.

Further modifications and applications of the present invention will be readily apparent to the appropriately skilled person from the teaching herein, without departing from the scope of the appended claims.

The invention claimed is:

1. A method of processing data packets, each data packet comprising source indication data, the method comprising:
   creating a first data packet at a control element, the source indication data of the first data packet comprising data indicating a first source different from said control element, and further comprising data indicating that the first data packet was created by the control element; and
   transmitting the first data packet to a destination;
   wherein said source indication data of each data packet is intended to indicate a device that created the data packet;
   wherein the first data packet comprises a tag value, and said data indicating that the first data packet was created at the control element comprises a tag value in a specified range, said specified range being defined with reference to data stored at the control element; and
   wherein said first source generates data packets having tag values in a first range, and said specified range comprises values outside said first range.

2. A method according to claim 1, wherein said first data packet comprises data indicating said destination.

3. A method according to claim 1, wherein the first data packet is a PCI Express data packet.

4. A method according to claim 1, wherein said specified range is defined with reference to said first source.

5. A method according to claim 1, further comprising receiving a second data packet at said control element, the second data packet being generated in response to said first data packet.

6. A method according to claim 5, further comprising forwarding said second data packet to said control element at a switching device if but only if said second data packet comprises data indicating that the second data packet was generated in response to a data packet generated by the control element.

7. A method according to claim 5, further comprising forwarding said second data packet to a destination specified in said second data packet at a switching device, if but only if said second data packet comprises data indicating that the second data packet was not generated in response to a data packet generated by the control element.

8. A method according to claim 6, wherein said data indicating that the second data packet was generated in response to a data packet generated by the control element comprises a tag value in said specified range.

9. A method according to claim 8, further comprising storing data indicating said specified range at said switching device.

10. A method according to claim 1, wherein said first source is an input or output device.

11. A method according to claim 1, wherein said destination is a computing device.

12. A method according to claim 1, further comprising:
receiving at the control element a third data packet associated with said first source.

13. A method according to claim 12, further comprising generating a fourth data packet at said control element in response to said receiving of the third data packet, and transmitting said fourth data packet to the first source.

14. A method according to claim 12, wherein said first data packet is generated in response to said receiving of the third data packet.

15. A method according to claim 12, further comprising forwarding said third data packet to said control element at a switching device.

16. A method according to claim 15, further comprising, at the switching device:
processing the third data packet to determine whether said third data packet satisfies a predetermined criterion; and
forwarding said third data packet to said control element if but only if said third data packet satisfies said predetermined criterion.

17. A method according to claim 16, wherein said predetermined criterion is based upon a type of transaction with which the first data packet is associated.

18. A non-transitory computer readable medium carrying a computer program comprising computer readable instructions adapted to cause a computer to carry out a method according to claim 1.

19. Apparatus for processing data packets, the apparatus comprising:
a memory storing processor readable instructions; and
a processor configured to read and execute instructions stored in said memory;
wherein said instructions comprise instructions controlling the processor to carry out a method according to claim 1.

20. A control element for processing data packets, each data packet comprising source indication data, the control element comprising:
a processor arranged to create a first data packet, the source indication data of the first data packet comprising data indicating a first source different from the control element, and further comprising data indicating that the first data packet was created by the control element; and
a transmitter arranged to transmit the first data packet to a destination;
wherein said source indication data of each data packet is intended to indicate a device that created the data packet;
wherein the first data packet comprises a tag value, and said data indicating that the first data packet was created at the control element comprises a tag value in a specified range, said specified range being defined with reference to data stored at the control element; and
wherein said first source generates data packets having tag values in a first range, and said specified range comprises values outside said first range.

21. A method of processing a received data packet having an associated request data packet, the method comprising:
determining a tag value indicative of a request data packet associated with a received data packet;
processing said tag value to determine whether said request data packet was generated by a control element, wherein said control element is different from an entity indicated in source indication data of the request data packet, wherein said source indication data is intended to indicate a device that created the request data packet; and
forwarding the received data packet to said control element if but only if it is determined that the request data packet was generated by the control element;
wherein determining whether said request data packet was generated by said control element comprises determining whether said tag value is within a specified range;
wherein said specified range is defined with reference to data stored at the control element and/or a switching device;
wherein said specified range is defined with reference to at least one source of data packets, said at least one source of data packets being in communication with the control element; and
wherein said at least one source generates data packets having tag values in a first range, and said specified range comprises identifiers outside said first range.

22. A non-transitory computer readable medium carrying a computer program comprising computer readable instructions adapted to cause a computer to carry out a method according to claim 21.

23. Apparatus for processing data packets, the apparatus comprising:
a memory storing processor readable instructions; and
a processor configured to read and execute instructions stored in said memory;
wherein said instructions comprise instructions controlling the processor to carry out a method according to claim 21.

24. A switching device for processing a received data packet having associated request data packets, the switching device comprising:
a receiver arranged to receive data packets;
a processor arranged to determine an identifier indicative of a request data packet associated with a received data packet and to process said identifier to determine whether said request data packet was generated by a control element, wherein said control element is different from an entity indicated in source indication data of the request data packet, and wherein the source indication data is intended to indicate a source of the request data packet; and
a transmitter arranged to forward the received data packet to said control element if but only if it is determined that the request data packet was generated by the control element;
wherein determining whether said request data packet was generated by said control element comprises determining whether a tag value is within a specified range;
wherein said specified range is defined with reference to data stored at the control element and/or a switching device;
wherein said specified range is defined with reference to at least one source of data packets, said at least one source of data packets being in communication with the control element; and
wherein said at least one source generates data packets having tag values in a first range, and said specified range comprises identifiers outside said first range.

25. A method of processing data packets, each data packet comprising data intended to indicate a source of the data packet, the method comprising:

creating a first data packet at a control element, the data of the first data packet intended to indicate a source of the first data packet comprising data indicating a first source different from said control element, and further comprising data indicating that the first data packet was created by the control element;

transmitting the first data packet to a destination;

wherein the first data packet comprises a tag value, and said data indicating that the first data packet was created at the control element comprises a tag value in a specified range and wherein said first source generates data packets having tag values in a first range, and said specified range comprises values outside said first range; and wherein the method further comprise receiving at a switching device a completion packet in response to said first packet;

forwarding said completion packet to said control device if a tag value of said completion packet is within said specified range and forwarding said completion packet to said first source if said tag value of said completion packet is not within said specified range.

26. A method of processing data packets, each data packet comprising data intended to indicate a source of the data packet, the method comprising:

creating a first PCI Express data packet at a control element, the first data packet comprising a header portion, the header portion comprising a requester identifier intended to indicate a source of the first data packet, wherein the requester identifier of the first data packet comprises data indicating a first source different from said control element, and further comprising data indicating that the first data packet was created by the control element;

transmitting the first data packet to a destination;

wherein the first data packet comprises a tag value, and said data indicating that the first data packet was created by the control element comprises a tag value in a specified range, said specified range being defined with reference to data stored at the control element; and wherein said first source generates data packets having tag values in a first range, and said specified range comprises values outside said first range.

27. A method of processing data packets, each data packet comprising data intended to indicate a source of the data packet, the method comprising:

creating a first PCI Express data packet at a control element, the first data packet comprising a header portion, the header portion comprising a requester identifier intended to indicate a source of the first data packet, wherein the requester identifier of the first data packet comprises data indicating a first source different from said control element, and further comprising data indicating that the first data packet was created by the control element; and transmitting the first data packet to a destination;

wherein the first data packet comprises a tag value, and said data indicating that the first data packet was created at the control element comprises a tag value in a specified range and wherein said first source generates data packets having tag values in a first range, and said specified range comprises values outside said first range; and wherein the method further comprise receiving at a switching device a completion packet in response to said first packet;

forwarding said completion packet to said control device if a tag value of said completion packet is within said specified range and forwarding said completion packet to said first source if said tag value of said completion packet is not within said specified range.

* * * * *